(12) United States Patent
Kita et al.

(10) Patent No.: US 9,309,944 B2
(45) Date of Patent: Apr. 12, 2016

(54) AIR SPRING

(71) Applicant: SUMITOMO ELECTRIC INDUSTRIES, LTD., Osaka-shi, Osaka (JP)

(72) Inventors: Yoshiyuki Kita, Osaka (JP); Hirokazu Haraguchi, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 3 days.

(21) Appl. No.: 14/125,388

(22) PCT Filed: Apr. 1, 2013

(86) PCT No.: PCT/JP2013/059922
§ 371 (c)(1),
(2) Date: Dec. 11, 2013

(87) PCT Pub. No.: WO2014/013762
PCT Pub. Date: Jan. 23, 2014

(65) Prior Publication Data
US 2014/0300038 A1  Oct. 9, 2014

(30) Foreign Application Priority Data
Jul. 19, 2012 (JP) .................................. 2012-160543

(51) Int. Cl.
*F16F 5/00* (2006.01)
*F16F 9/05* (2006.01)
(Continued)

(52) U.S. Cl.
CPC ... *F16F 9/05* (2013.01); *B61F 5/02* (2013.01); *F16F 9/0454* (2013.01)

(58) Field of Classification Search
CPC ........... F16F 9/05; F16F 13/002; F16F 13/26; F16F 13/264; F16F 13/106; F16F 13/268; F16F 9/0454; B61F 5/08; B61F 5/10; B61F 5/02
USPC .......... 267/122, 121, 35, 64.19, 64.21, 64.23, 267/64.24, 64.27
See application file for complete search history.

(56) References Cited

U.S. PATENT DOCUMENTS 5,005,808 A     4/1991 Warmuth, II et al.
6,361,028 B1 *  3/2002 Hubbell ..................... 267/64.27
(Continued)

FOREIGN PATENT DOCUMENTS

CN    101469754 A    7/2009
JP    01-060687      1/1991
(Continued)

OTHER PUBLICATIONS

Miyamoto, "Illustrated Description of Mechanism of Train—Through Elucidation of Commuter Train—", 2nd edition, Toyokuni Printing Co., Ltd., Jan. 2010, including Partial English Translation of p. 46.
(Continued)

*Primary Examiner* — Pamela Rodriguez
(74) *Attorney, Agent, or Firm* — Drinker Biddle & Reath LLP

(57) ABSTRACT

An air spring includes an upper surface plate, a lower surface plate, and a diaphragm connecting the upper surface plate and the lower surface plate. The diaphragm has an annular shape having an opening on an inner circumferential side. In the diaphragm, an upper surface plate contact portion, which is a region defining the opening and being in contact with the upper surface plate, includes a deformed portion elastically deformed to protrude toward the lower surface plate side by contact with a support plate. The deformed portion is in contact with a sliding member located on the lower surface plate side when viewed from the deformed portion.

4 Claims, 6 Drawing Sheets

(51) Int. Cl.
*B61F 5/02* (2006.01)
*F16F 9/04* (2006.01)

(56) References Cited

U.S. PATENT DOCUMENTS

| | | | |
|---|---|---|---|
| 8,220,785 B2 * | 7/2012 | Bank et al. | 267/64.27 |
| 2011/0031662 A1 | 2/2011 | Toyama | |
| 2014/0117597 A1 * | 5/2014 | Fujimoto | 267/35 |

FOREIGN PATENT DOCUMENTS

| | | |
|---|---|---|
| JP | H04-247603 A | 9/1992 |
| JP | H09-382 U | 6/1997 |
| JP | 2007-120550 A | 5/2007 |
| JP | 2007-120551 A | 5/2007 |
| JP | 2009-162276 | 7/2009 |
| JP | 2009-204049 A | 9/2009 |
| JP | 2010-223372 A | 10/2010 |
| JP | 2011-021680 A | 2/2011 |

OTHER PUBLICATIONS

"Spring Rigging for Railway Rolling Stock JISE 4206", Japanese Industrial Standards Committee, May 1989, including Partial English Translation of pp. 8 and 10-12.

Japanese Office Action for counterpart application 2012-160543, dated Sep. 29, 2015.

Wang, et al., "Novel SYS-series Air Springs with Internal Pressure Ring Auxiliary Seal Structures," Vehicle Products and Spare Parts. Railway Rolling Stock, No. 7, vol. 48, Jul. 2008, pp. 16-17 (with its English Abstract & English Translation as attached).

Technical Agreement of Air Spring for Bogie of Electric Vehicle for Second Phase of the Engineering Construction of Beijing Metro Line No. 8, South Railway (CSR) Sifang (Qingdao) Corporation Limited, Agreement, No. 2 of Tech SFMZ14 (2009), pp. 1-9 (with its English Translation as attached).

Drawing of SYS540H Air Spring (with its Partial English Translation as attached), 1 sheet. date unknown.

* cited by examiner

AIR SPRING

TECHNICAL FIELD

The present invention relates to an air spring, and more particularly to an air spring that can suppress the increase in its weight and ensure the air tightness of a diaphragm more reliably.

BACKGROUND ART

In a railroad vehicle, an air spring is arranged between a vehicle main body and a bogie to reduce the impact and vibration applied to the vehicle body while the vehicle is running. The air spring mainly includes an upper surface plate connected to the vehicle main body side, a lower surface plate arranged below the upper surface plate, and a rubber diaphragm arranged to connect the upper surface plate and the lower surface plate, and by elastic deformation of the diaphragm, the air spring can reduce the impact and vibration in the vertical direction during running. Examples of a sealing method for ensuring the air tightness of the diaphragm in the air spring include a fastening sealing method in which the diaphragm is sandwiched between the upper surface plate and one fastening fitting as well as between the lower surface plate and the other fastening fitting, and the diaphragm is fastened by bolts (refer to, for example, Miyamoto, "Illustrated Description of Mechanism of Train-Thorough Elucidation of Commuter Train-", 2nd edition, Toyokuni Printing Co., Ltd., January, 2010, p. 46 (NPD 1)), a self-sealing method in which the diaphragm is fixed to each of the upper surface plate and the lower surface plate by using the inner pressure of the diaphragm (refer to, for example, "Spring Rigging for Railway Rolling Stock JISE 4206", Japanese Industrial Standards Committee, May, 1989, p. 8, 10-12 (NPD 2)), and the like.

CITATION LIST

Non Patent Document

NPD 1: Miyamoto, "Illustrated Description of Mechanism of Train—Thorough Elucidation of Commuter Train-", 2nd edition, Toyokuni Printing Co., Ltd., January, 2010, p. 46
NPD 2: "Spring Rigging for Railway Rolling Stock JISE 4206", Japanese Industrial Standards Committee, May, 1989, p. 8, 10-12

SUMMARY OF INVENTION

Technical Problem

In the air spring that adopts the fastening sealing method, the fastening fittings excellent in stiffness and strength are used to ensure the air tightness of the diaphragm. These fastening fittings are heavy in weight. Therefore, use of these fastening fittings leads to an increase in overall weight of the air spring, disadvantageously.

In the air spring that adopts the self-sealing method, it is difficult to ensure contact between the diaphragm and the upper surface plate in the case where the external force is applied in the deflated state with low inner pressure of the diaphragm due to vibration during transportation or handling during inspection, in the case where the diaphragm is significantly deformed due to large displacement applied from the horizontal direction while the vehicle is running, or in the other cases. Therefore, the diaphragm falls off from the upper surface plate and air leakage takes place from between the diaphragm and the upper surface plate, disadvantageously. There has also been proposed a structure including a projection (hump) on the lower side of a region of the upper surface plate with which the diaphragm is in contact, in order to prevent the falloff of the diaphragm from the upper surface plate. Such structure cannot, however, prevent the air leakage from the diaphragm effectively.

The present invention has been made in light of the aforementioned problem, and an object thereof is to provide an air spring that can suppress the increase in its weight and ensure the air tightness of the diaphragm more reliably.

Solution to Problem

An air spring according to the present invention includes: a first support member; a second support member spaced apart from the first support member in a primary load direction; and an elastically deformable diaphragm connecting the first support member and the second support member to form a closed space. The diaphragm has an annular shape having an opening on an inner circumferential side. In the diaphragm, a first contact portion, which is a region defining the opening and being in contact with the first support member, includes a deformed portion elastically deformed to protrude toward the second support member side by contact with the first support member. The deformed portion is in contact with the first support member located on the second support member side when viewed from the deformed portion.

In the air spring according to the present invention, the deformed portion of the diaphragm is in contact with the first support member located on the second support member side when viewed from the deformed portion. Therefore, the contact between the diaphragm and the first support member can be ensured reliably at the deformed portion, without using a heavy-weight fastening member and the like to fix the diaphragm to the first support member. As a result, the falloff of the diaphragm from the first support member can be suppressed, and thus, the air leakage from the diaphragm can be prevented. As described above, according to the air spring of the present invention, there can be provided an air spring that can suppress the increase in its weight and ensure the air tightness of the diaphragm more reliably.

In the aforementioned air spring, the deformed portion may be compressed in the primary load direction by contact with the first support member located on the second support member side when viewed from the deformed portion.

As a result, just when the deformed portion of the diaphragm falls off from the first support member, the compressed deformed portion is restored, and thus, the contact between the diaphragm and the first support member can be ensured more reliably. Consequently, the air tightness of the diaphragm can be ensured even more reliably.

In the aforementioned air spring, the first support member may include a first support and a second support arranged on the second support member side when viewed from the first support. The deformed portion may be in contact with the second support.

As a result, the contact between the diaphragm and the first support member is ensured reliably, and attachment and removal of the diaphragm become easier.

In the aforementioned air spring, the second support may be a sliding member. As a result, the impact and vibration applied from outside can be easily lessened. By using the sliding member, an increase in the number of components can be avoided and the air tightness of the diaphragm can be ensured reliably. The sliding member herein refers to a component having a reduced surface friction coefficient as compared with the other components of the aforementioned air spring.

In the aforementioned air spring, the second support may have, on an outer circumferential surface, a protruding portion protruding toward a side opposite to the second support member. The deformed portion may be in contact with the second support at the protruding portion. As a result, the diaphragm and the first support member can be brought into contact with each other more easily.

In the aforementioned air spring, the second support member may be arranged below the first support member in the primary load direction. As a result, the structure of the aforementioned air spring can be further simplified.

Advantageous Effects of Invention

As is clear from the aforementioned description, according to the air spring of the present invention, there can be provided an air spring that can suppress the increase in its weight and ensure the air tightness of the diaphragm more reliably.

DESCRIPTION OF EMBODIMENTS

Figure 1:
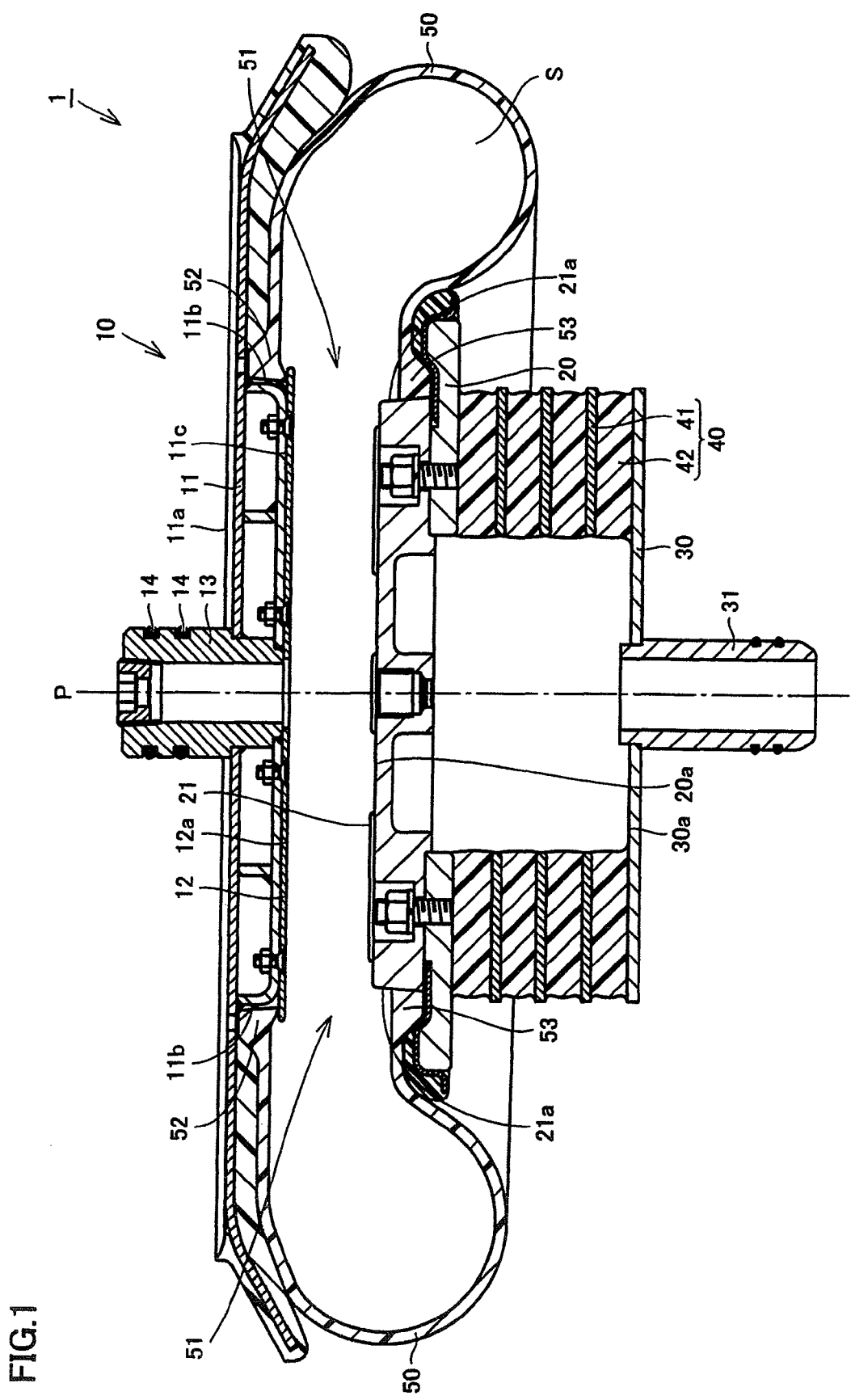
FIG. 1 is a schematic view showing a structure of an air spring.

Embodiments of the present invention will be described hereinafter with reference to the drawings, in which the same or corresponding portions are denoted by the same reference numerals and description thereof will not be repeated.

Figure 7:
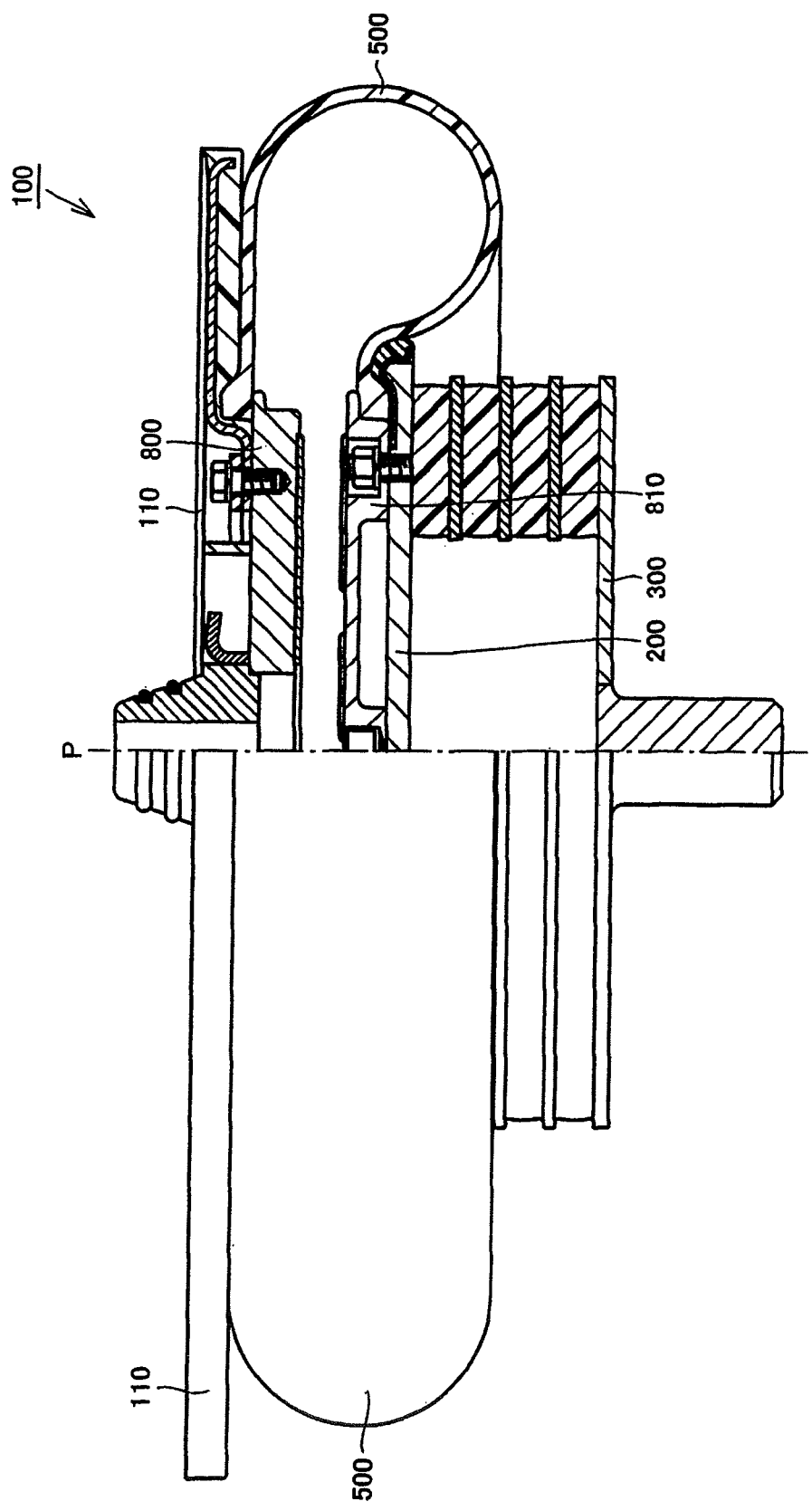
FIG. 7 is a schematic view for describing an air spring according to a comparative example.

In the beginning, a structure of an air spring according to a comparative example will be described. A structure of an air spring 100 according to one comparative example will be described first. Referring to FIG. 7, in air spring 100, a diaphragm 500 is sandwiched between an upper surface plate 110 and a fastening fitting 800 as well as between a lower surface plate 200 and a fastening fitting 810, and diaphragm 500 is fastened by bolts. In air spring 100, the air tightness of diaphragm 500 is ensured, while it is necessary to use heavyweight fastening fittings 800 and 810, which leads to an increase in overall weight of the air spring disadvantageously. It is also necessary to apply uniform force to a sealed portion of diaphragm 500 and fasten diaphragm 500 in order to prevent the air leakage, which leads to an increase in the number of components such as bolts. In addition, stress relaxation (creep) occurs in the sealed portion of diaphragm 500, and thus, torque management during fastening is difficult and the assembly work requires a technique.

Figure 8:
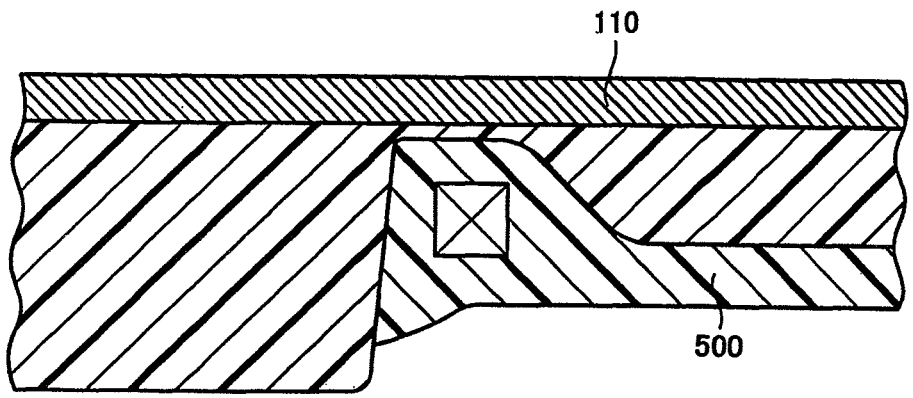
FIG. 8 is a schematic view for describing an air spring according to a comparative example.
Figure 9:
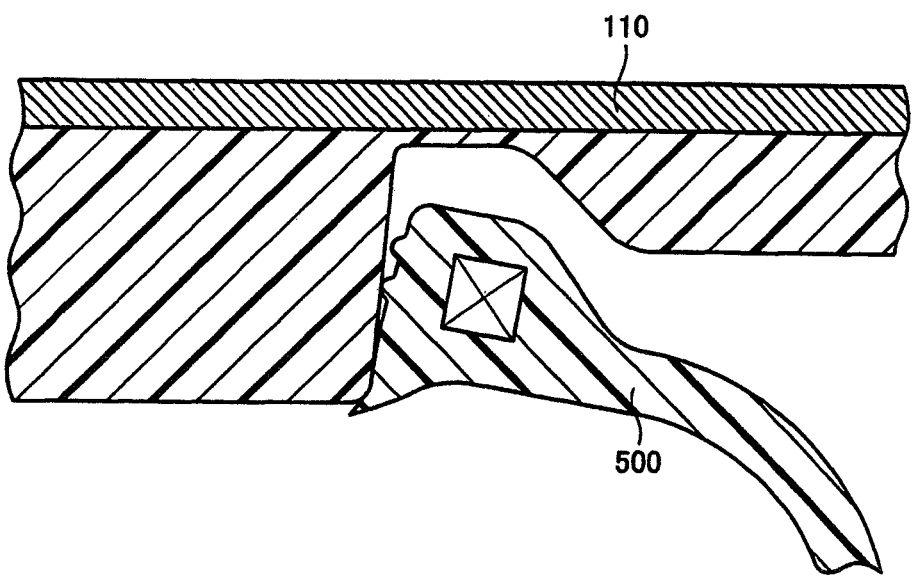
FIG. 9 is a schematic view for describing the air spring according to the comparative example.

Next, a structure of an air spring according to another comparative example will be described. Referring to FIG. 8, in this air spring, diaphragm 500 is fixed to upper surface plate 110 by using the inner pressure of diaphragm 500. In this air spring, it is difficult to ensure contact between diaphragm 500 and upper surface plate 110 in the case where the external force is applied in the deflated state with low inner pressure of diaphragm 500 due to vibration during transportation or handling during inspection, in the case where diaphragm 500 is significantly deformed due to large displacement applied from the horizontal direction while the vehicle is running, or in the other cases. Therefore, as shown in FIG. 9, diaphragm 500 falls off from upper surface plate 110 and the air leakage takes place from between diaphragm 500 and upper surface plate 110, disadvantageously. In order to deal with the aforementioned air spring according to the comparative example, an air spring according to the present embodiment is an air spring that can suppress the increase in its weight and ensure the air tightness of the diaphragm more reliably as described below.

A structure of an air spring according to one embodiment of the present invention will be described first. Referring to FIG. 1, an air spring 1 according to the present embodiment mainly includes an upper surface plate 10 serving as a first support member, a lower surface plate 20 serving as a second support member, a rubber lower plate 30, a stacked rubber 40, and a diaphragm 50.

Upper surface plate 10 mainly has a support plate 11 serving as a first support, and a sliding member 12 serving as a second support. Support plate 11 has, for example, a circular shape centered at an axis line (central axis) P, when viewed from above an upper surface 11a. In a central portion including axis line P, support plate 11 is provided with a circular-platform-shaped protruding portion protruding toward the lower surface plate 20 side, and an outer circumferential surface of the protruding portion is provided with a circumferential surface 11b along axis line P. Circumferential surface 11b is formed to be substantially parallel to axis line P.

Sliding member 12 is arranged on the lower surface plate 20 side when viewed from support plate 11. More specifically, sliding member 12 is fixed to support plate 11 by a bolt on a lower surface 11c of the protruding portion formed on support plate 11. Sliding member 12 includes a region extending more radially outwardly than the protruding portion. A main surface 12a of sliding member 12 that faces lower surface plate 20 is a surface having a reduced friction coefficient.

A vehicle body-side spigot 13 protruding toward the side opposite to the lower surface plate 20 side along axis line P is attached to a region of upper surface plate 10 including axis line P. An O-ring 14 is attached to an outer circumferential portion of vehicle body-side spigot 13. Upper surface plate 10 is connected to the vehicle body side (not shown) via vehicle body-side spigot 13.

The shape of support plate 11 when viewed from above upper surface 11a is not limited to the circular shape, and may be, for example, a rectangular shape, a shape of petals, or such a shape that a part of the outer circumferential portion protrudes radially. In addition, as shown in FIG. 1, support plate 11 has such a shape that, toward the radial outer side, support plate 11 is bent along the outer shape of diaphragm 50 downwardly in the primary load direction when viewed from support plate 11. As a result, damage caused by contact between diaphragm 50 and support plate 11 can be prevented.

Lower surface plate 20 is spaced apart from and arranged below upper surface plate 10 in the primary load direction so as to share axis line P with upper surface plate 10. A sliding plate 21 made of, for example, stain less steel is arranged on a main surface 20a of lower surface plate 20 that faces upper surface plate 10. Similarly to circumferential surface 11b of upper surface plate 10, lower surface plate 20 is provided with a circumferential surface 21a along axis line P.

Diaphragm 50 connects upper surface plate 10 and lower surface plate 20 to form a closed space. Diaphragm 50 is made of, for example, rubber and is elastically deformable. A structure of diaphragm 50 will be described in detail. Diaphragm 50 has an annular shape centered at axis line P, which has an opening 51 on the inner circumferential side. Diaphragm 50 includes an upper surface plate contact portion 52 and a lower surface plate contact portion 53 serving as a first contact portion that defines opening 51, and diaphragm 50 is in contact with circumferential surfaces 11b and 21a of upper surface plate 10 and lower surface plate 20 at upper surface plate contact portion 52 and lower surface plate contact portion 53, respectively. As a result, upper surface plate 10, lower surface plate 20 and diaphragm 50 form a closed space S.

Figure 2:
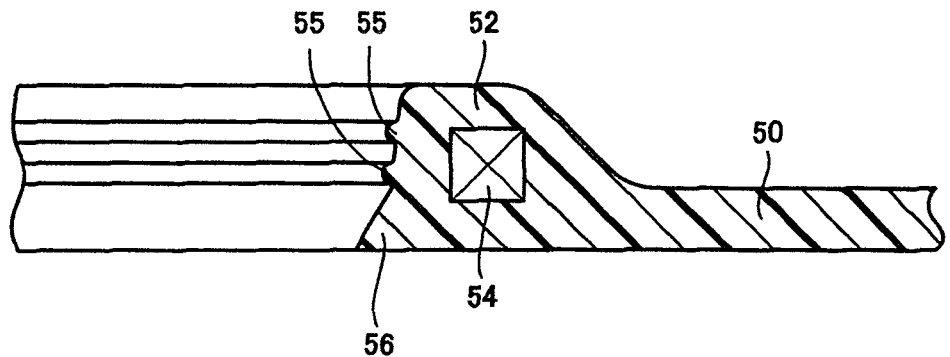
FIG. 2 is a schematic view showing a structure of a diaphragm of the air spring.
Figure 3:
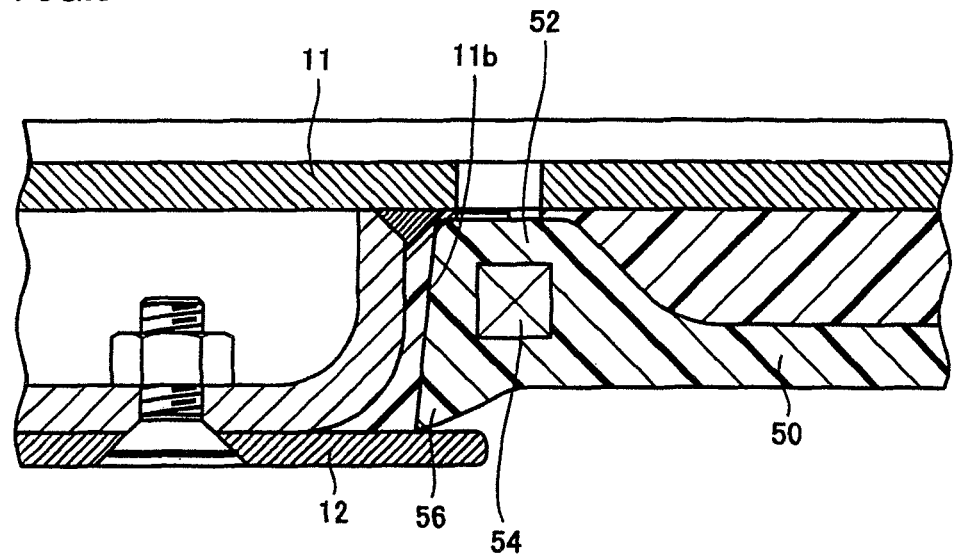
FIG. 3 is an enlarged schematic view of the structure of the air spring.

The structure of diaphragm 50 will be described in more detail with reference to FIGS. 2 and 3. First, the structure of diaphragm 50 before diaphragm 50 is incorporated into air spring 1 will be described with reference to FIG. 2. A wire 54 having a circular shape along the circumferential surface of the support plate forming the upper surface plate is embedded in upper surface plate contact portion 52 of diaphragm 50. Upper surface plate contact portion 52 is provided with a projecting portion 55 and a deformed portion 56 protruding toward the inner circumferential side of diaphragm 50. Deformed portion 56 is formed such that an inner diameter of diaphragm 50 becomes gradually smaller toward the axial lower side.

Next, the structure of diaphragm 50 incorporated into air spring 1 will be described with reference to FIG. 3. Deformed portion 56 of upper surface plate contact portion 52 is in contact with circumferential surface 11b to follow circumferential surface 11b of support plate 11 formed along the axial direction. As a result, deformed portion 56 is elastically deformed to protrude toward the lower surface plate side. Deformed portion 56 elastically deformed as described above is in contact with the upper surface plate (sliding member 12) located on the lower surface plate side when viewed from deformed portion 56. At this time, deformed portion 56 may be compressed by the contact with sliding member 12, and more specifically, may be compressed in the primary load direction.

Referring to FIG. 1, laminated rubber 40 is arranged on the side opposite to upper surface plate. 10 when viewed from lower surface plate 20. Laminated rubber 40 has a plurality of hard layers 41 made of metal or the like as well as a plurality of elastic layers 42 made of rubber or the like, and has such a structure that hard layers 41 and elastic layers 42 are alternately stacked in the primary load direction, for example. Since laminated rubber 40 has the plurality of elastic layers 42, laminated rubber 40 is elastically deformable. A hollow portion is formed in a region of laminated rubber 40 including axis line P.

Rubber lower plate 30 is arranged under laminated rubber 40 so as to share axis line P with upper surface plate 10 and lower surface plate 20. A bogie-side spigot 31 protruding toward the side opposite to laminated rubber 40 along axis line P is formed in a region of rubber lower plate 30 near axis line P. In other words, bogie-side spigot 31 as a small-diameter portion protruding with axis line P being the central axis is attached to rubber lower plate 30. Rubber lower plate 30 is connected to the bogie (not shown) side via bogie-side spigot 31. Air spring 1 supports the vehicle body (not shown) with respect to the bogie (not shown) on a support surface 30a of rubber lower plate 30.

As described above, in air spring 1 according to the present embodiment, deformed portion 56 of diaphragm 50 is in contact with upper surface plate 10 (sliding member 12) located on the lower surface plate 20 side when viewed from deformed portion 56. Therefore, even in the case where the external force is applied in the deflated state with low inner pressure of diaphragm 50 due to vibration during transportation or handling during inspection, in the case where diaphragm 50 is significantly deformed due to large displacement applied from the horizontal direction while the vehicle is running, or in the other cases, for example, the contact between diaphragm 50 and upper surface plate 10 can be ensured reliably at deformed portion 56, without using a heavy-weight fastening member and the like to fix diaphragm 50 to upper surface plate 10. As a result, the falloff of diaphragm 50 from upper surface plate 10 can be suppressed, and thus, the air leakage from diaphragm 50 can be prevented. In addition, the structure itself of the air spring is further simplified as compared with the case of using the fastening member. Thus, air spring 1 according to the present embodiment is an air spring that can suppress the increase in its weight and ensure the air tightness of diaphragm 50 more reliably.

In addition, in air spring 1, deformed portion 56 of diaphragm 50 may be compressed in the primary load direction by the contact with upper surface plate 10 (sliding member 12) located on the lower surface plate 20 side when viewed from deformed portion 56, as described above. As a result, just when diaphragm 50 falls off from upper surface plate 10, compressed deformed portion 56 is restored, and thus, the contact between diaphragm 50 and upper surface plate 10 can be ensured more reliably. Consequently, the air tightness of diaphragm 50 can be ensured more reliably.

In addition, in air spring 1, upper surface plate 10 may include support plate 11 and sliding member 12 arranged on the lower surface plate 20 side when viewed from support plate 11, as described above. Deformed portion 56 of diaphragm 50 may be in contact with sliding member 12. As a result, the contact between diaphragm 50 and upper surface plate 10 can be ensured reliably, and attachment and removal of diaphragm 50 become easier. In other words, in air spring 1, simply by radially extending sliding member 12 required to lessen the impact and vibration from outside, an increase in the number of components can be avoided and the contact between sliding member 12 and diaphragm 50 can be ensured reliably. In addition, sliding member 12 can be attached to support plate 11 after fixing diaphragm 50 to support plate 11. Therefore, even when an outer diameter of sliding member 12 is increased to ensure sufficient contact between diaphragm 50 and sliding member 12, diaphragm 50 can be easily attached during assembly of air spring 1. In addition, by removing sliding member 12, the operation for removing diaphragm 50 can also be easily performed.

Next, an air spring according to a modification of the present embodiment will be described. An air spring 2 according to the present modification has a configuration basically similar to that of air spring 1 according to the present embodiment described above, and produces the similar effect. Air spring 2 according to the present modification is, however, different from air spring 1 according to the present embodiment described above, in terms of a structure of the sliding member included in the upper surface plate.

Figure 4:
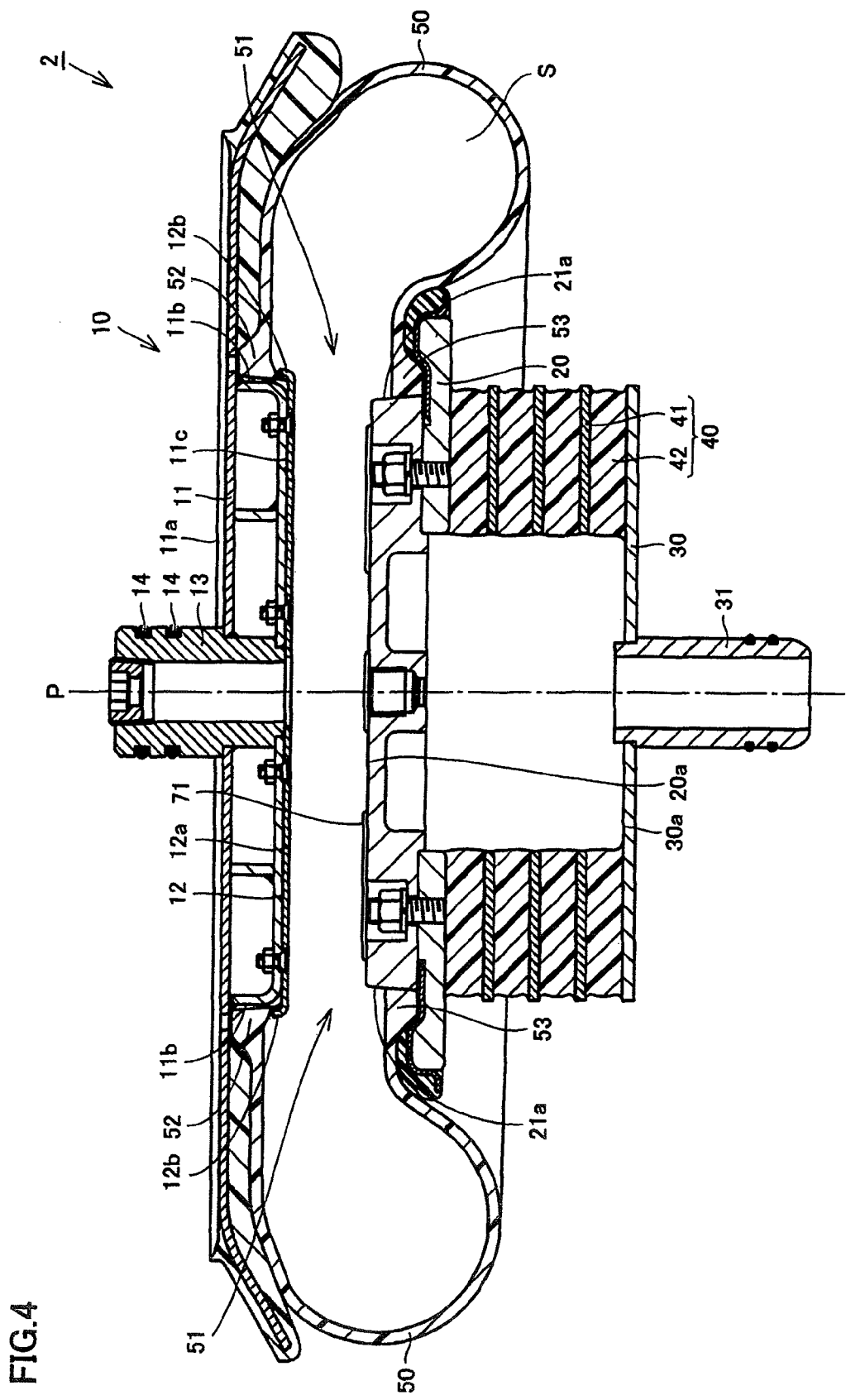
FIG. 4 is a schematic view showing a structure of an air spring according to a modification.
Figure 5:
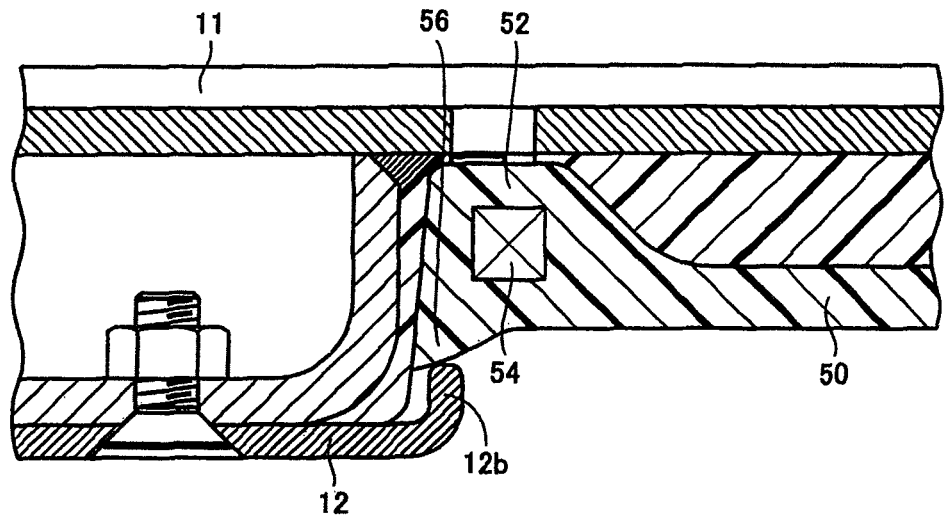
FIG. 5 is an enlarged schematic view showing the structure of the air spring according to the modification.
Figure 6:
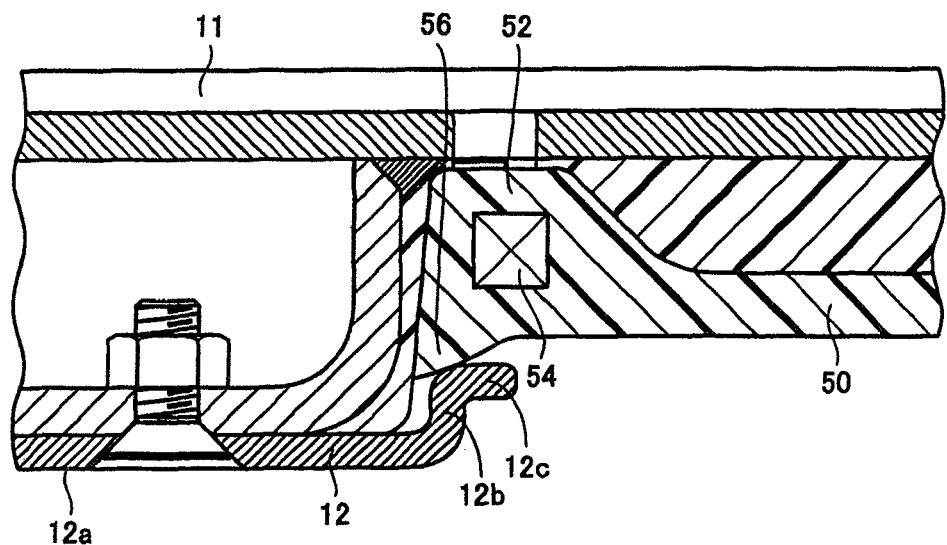
FIG. 6 is an enlarged schematic view showing the structure of the air spring according to the modification.

Referring to FIG. 4, in air spring 2, sliding member 12 included in upper surface plate 10 has, on the outer circumferential surface, a protruding portion 12b protruding toward the side opposite to the lower surface plate 20 side. Referring to FIG. 5, deformed portion 56 of diaphragm 50 is in contact with sliding member 12 at protruding portion 12b. Referring to FIG. 6, protruding portion 12b has a bent portion 12c bent along main surface 12a of sliding member 12, and deformed portion 56 may be in contact with sliding member 12 at this bent portion 12c. In air spring 2 according to the present modification, by using sliding member 12 having the aforementioned structure, diaphragm 50 and upper surface plate 10 can be brought into contact with each other more easily.

Although the case of using upper surface plate 10 as the first support member and lower surface plate 20 as the second support member has been described in air springs 1 and 2 according to the present embodiment and the present modification described above, the air spring according to the present invention is not limited thereto. In other words, in the air spring according to the present invention, lower surface plate 20 may be used as the first support member and upper surface plate 10 may be used as the second support member. In this case, there is obtained a structure in which lower surface plate contact portion 53 serving as the first contact portion includes a deformed portion elastically deformed to protrude toward the upper surface plate 10 side by contact with lower surface plate 20, and this deformed portion is in contact with lower surface plate 20 located on the upper surface plate 10 side when viewed from the deformed portion. As a result, falloff of diaphragm 50 from lower surface plate 20 can be suppressed, and thus, air leakage from diaphragm 50 can be prevented. Consequently, similarly to air springs 1 and 2 according to the present embodiment and the present modification described above, the increase in weight can be suppressed and the air tightness of diaphragm 50 can be ensured more reliably.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

INDUSTRIAL APPLICABILITY

The air spring according to the present invention is particularly advantageously applicable to an air spring that is required to suppress the increase in its weight and ensure the air tightness of the diaphragm reliably.

REFERENCE SIGNS LIST 1, 2 air spring; 10 upper surface plate; 11 support plate; 11a upper surface; 11b, 21a circumferential surface; 11c lower surface; 12 sliding member; 12a, 20a main surface; 12b protruding portion; 12c bent portion; 13 vehicle body-side spigot; 14 O-ring; 20 lower surface plate; 21 sliding plate; 30 rubber lower plate; 30a support surface; 31 bogie-side spigot; 40 laminated rubber; 41 hard layer; 42 elastic layer; 50 diaphragm; 51 opening; 52 upper surface plate contact portion; 53 lower surface plate contact portion; 54 wire; 55 projecting portion; 56 deformed portion; P axis line; S closed space.

The invention claimed is:

1. An air spring, comprising:
a first support member;
a second support member spaced apart from said first support member in a primary load direction; and
an elastically deformable diaphragm connecting said first support member and said second support member to form a closed space, wherein
said diaphragm has an annular shape having an opening on an inner circumferential side,
in said diaphragm, a first contact portion, which is a region defining said opening and being in contact with said first support member, includes a deformed portion elastically deformed to protrude toward said second support member side by contact with said first support member,
said deformed portion is in contact with said first support member located on said second support member side when viewed from said deformed portion,
the first support member includes a first support and a second support arranged on the second support member side when viewed from said first support,
the deformed portion is compressed in the primary load direction by contact with the second support, and
the second support is in contact with an underside of the deformed portion.

2. The air spring according to claim 1, wherein said second support is a sliding member.

3. The air spring according to claim 1, wherein said second support has, on an outer circumferential surface, a protruding portion protruding toward a side opposite to said second support member side, and said deformed portion is in contact with said second support at said protruding portion.

4. The air spring according to claim 1, wherein said second support member is arranged below said first support member in said primary load direction.

* * * * *